US00RE37937E

(19) United States
(12) Reissued Patent
Mann

(10) Patent Number: US RE37,937 E
(45) Date of Reissued Patent: Dec. 10, 2002

(54) INTEGRATED DISPOSABLE EAR PIERCING EARRING AND CLUTCH CARTRIDGE AND EAR PIERCING INSTRUMENT FOR USE THEREWITH

(75) Inventor: Samuel J. Mann, Fair Lawn, NJ (US)

(73) Assignee: Inverness Corporation, Fair Lawn, NJ (US)

(21) Appl. No.: 08/517,510

(22) Filed: Aug. 21, 1995

Related U.S. Patent Documents

Reissue of:
(64) Patent No.: 5,263,960
Issued: Nov. 23, 1993
Appl. No.: 07/975,318
Filed: Nov. 12, 1992

(51) Int. Cl.[7] ..... A61B 17/34
(52) U.S. Cl. ..... 606/188
(58) Field of Search ..... 606/167, 172, 606/181, 182, 184, 185, 188

(56) References Cited

U.S. PATENT DOCUMENTS 4,030,507 A * 6/1977 Mann ..... 606/188
4,527,563 A * 7/1985 Reil ..... 606/188
4,860,747 A * 8/1989 Sciara ..... 606/188
4,931,060 A * 6/1990 Aué ..... 606/188
5,004,470 A * 4/1991 Mann ..... 606/188
5,004,471 A * 4/1991 Mann ..... 606/188
5,007,918 A * 4/1991 Mann ..... 606/188
5,350,394 A * 9/1994 Mann ..... 606/188

* cited by examiner

*Primary Examiner*—Michael Powell Buiz
*Assistant Examiner*—N. Kent Gring
(74) *Attorney, Agent, or Firm*—Stroock & Stroock & Lavan LLP

(57) ABSTRACT

An ear piercing assembly includes a disposable cartridge assembly including a first and second ear piercing earring and an ear piercing earring retaining sub-assembly for releaseably supporting the ear piercing earring therein. A clutch retaining sub-assembly is integrally formed with the ear piercing earring retaining sub-assembly and releaseably supports a first and second clutch therein. An ear piercing instrument is adapted to receive the cartridge assembly and includes a plunger assembly for ejecting an ear piercing earring from the ear piercing earring retaining sub-assembly and is displaceable for selectively moving between a first position for ejecting the first ear piercing earring from the ear piercing earring retaining sub-assembly and a second position for ejecting the second ear piercing earring from the ear piercing earring retaining sub-assembly.

41 Claims, 7 Drawing Sheets

102
93
85
91
88
57a
56a
161
52a
46
46b
43
54a
38
148
63
68
62
64
61
69
68
66
65
36
133
33
37
32
45
146a
14
55a
55
55b
53
12a
92
94
90
96
87
202
161
122
135
118
104
86
76
81
78
83
106
110
80
206
204
200
206
208
72
131
130
124
64
47
54a
52a
48a
50a
161
57a
58a
51
54b
163
50b
52b
48b
56a
56b
58a

INTEGRATED DISPOSABLE EAR PIERCING EARRING AND CLUTCH CARTRIDGE AND EAR PIERCING INSTRUMENT FOR USE THEREWITH

Matter enclosed in heavy brackets [ ] appears in the original patent but forms no part of this reissue specification; matter printed in italics indicates the additions made by reissue.

BACKGROUND OF THE INVENTION

This invention is directed to a disposable earlobe piercing earring and clutch cartridge and instrument for use therewith and in particular, to an earlobe piercing assembly for facilitating earlobe piercing and maintaining the piercing earring sterile during handling, storage and piercing.

The most recent prior art ear piercing systems are of two types, namely cartridge housed earrings and open earrings. Both types operate by inserting a pointed earring or stud through the earlobe. This earring remains in place four to six weeks until the hole produced is healed.

The cartridge housed earring systems utilize either a cartridge housing a single piercing earring and clasp, requiring two cartridges per pair of earrings; a separate cartridge for each earring and clasp requiring four cartridges per pair of earrings; or no cartridge, but instead earrings and clasps which are unprotected and inserted into the piercing instrument from a carrier block. In all cases excessive handling with a high potential for earrings coming in contact with the fingers of the ear piercing instrument operator result, increasing the chance of cross contamination between successive ear piercing patients and the ear piercing instrument operator. Furthermore, these systems do not protect the instrument itself from contamination due to human contact or back splashing of blood or fluids during piercing.

Two prior art references, namely U.S. Pat. Nos. 5,004,470 and 5,007,918 issued to Samuel J. Mann introduced disposable, cartridge housed earrings of several different and random shaped styles featuring enclosure or encapsulation of the earring so that the earring may not be touched before or during the piercing process. The earring clasps or clutches are housed in a separate cartridge and are not totally encapsulated, but make direct contact with the operator difficult. When utilizing these prior art systems, both earring cartridges and clasp cartridges are inserted into a piercing instrument. This piercing instrument is of simple design and retains the cartridge within slide tracks. The earlobe is placed in the gap between the ear piercing earring cartridge and the clasp clutch cartridge. The plunger is displaced into the earring cartridge, ejecting the earring out of the cartridge, through the earlobe, and into the clasp, automatically releasing the clasp from the cartridge, completing the piercing process. In order to form a second piercing hole, both the earring cartridge and clutch cartridge are removed from the instrument, inverted, and the process is repeated. In the system of U.S. Pat. No. 5,004,470 the stud cartridge and clutch cartridge are not removed, but are slid within the ear piercing instrument to place the non-ejected earring in piercing position.

These prior art devices have been satisfactory. However, they suffer from the disadvantage that the disposable cartridges which prevent contact between each person and the instrument do not fully cover the piercing area of the instrument itself which is proximate to the earlobe allowing potential for contamination from blood back splash or the like. Additionally, because the cartridge must be inverted or slid by hand by the ear piercing instrument operator, the cartridges are still excessively handled exposing the cartridges to contamination from the operator as well as the susceptibility of being dropped. This is particularly significant when handling the clutch cartridge in which the clutches are exposed to some extent and may even be touched during handling.

A further deficiency, particularly in the ear piercing cartridge assembly of U.S. Pat. No. 5,007,918 is the use of a pair of bullet shaped capsules which are split longitudinally with the halves being connected by means of a thin hinge molded into the halves at the front of the bullet in the ejection direction. During the piercing procedure, as the earring is ejected, the earring must break the hinge in order to exit the front of the bullet and pass into the earlobe. Additional force is required to break the hinge thus making the procedure balky, preventing smooth insertion of the ear piercing earring. Such force requirements make operation difficult for some operators.

A further deficiency in the prior art ear piercing cartridge assemblies is that during the ear piercing process, it is necessary for the operator to hold the earlobe firmly in place against the clutch cartridge. The operator utilizes their fingertips to hold the earlobe in place. If the operator does not follow rigid cleansing procedures, the potential for contamination of the earlobe being pierced exists. Additionally, because the earlobe is not firmly retained in place, even when held by the operator's fingers, it is possible that nervous ear piercing patients will move their head causing the earring being inserted to be deflected from its intended path causing it to pierce portions of the ear other than the intended location, or it could be deflected sideways and only partially into the earlobe causing pain, bleeding and the need to reinsert the earring.

Accordingly, an ear piercing instrument and cartridge which eliminates earring handling through a simple, unitary construction and overcomes the shortcomings of the prior art is desired.

SUMMARY OF THE INVENTION

Generally speaking, in accordance with the instant invention, an integrated disposable ear piercing earring and clutch cartridge and ear piercing instrument for use therewith are provided. An ear piercing earring and clutch cartridge assembly ("cartridge assembly") formed of a single, unitary piece includes a clutch retaining sub-assembly containing two clutches in side by side relationship. The cartridge also includes an ear piercing earring retaining sub-assembly which contains two ear piercing earrings to cooperate with an associated clutch. The cartridge is provided with a saddle region for receiving an earlobe between the clutch retaining sub-assembly and the ear piercing earring retaining sub-assembly.

The ear piercing instrument is adapted to receive the cartridge. A plunger assembly is mounted within the housing and is selectively capable of driving either the first or second ear piercing earring from the ear piercing earring retaining sub-assembly to engage the associated clutch.

In one embodiment of the invention, the cartridge includes a clamp disposed within the saddle region for clamping the earlobe in place within the cartridge during piercing. The ear piercing earring retaining sub-assembly includes a bullet cartridge housing the ear piercing earring. The bullet cartridge is slidably mounted within the cartridge so that the bullet cartridge is moved within the cartridge towards the clutch retaining sub-assembly prior to ejection of the earring from the ear piercing earring retaining sub-assembly. The push rod assembly includes a push rod formed with a retraction hook for returning the bullet to the starting position. The plunger assembly also includes a plunger for moving the clamp into a position for clamping the earlobe in place prior to ejection of the ear piercing earring from the earring retaining sub-assembly.

Accordingly, it is an object of the present invention to provide an improved ear piercing earring cartridge and an ear piercing instrument for use therewith.

Another object of the invention is to provide a disposable earring cartridge for use with an ear piercing instrument being configured to shield from contamination all relevant areas of the ear piercing instrument which are proximate to the earlobe being pierced.

A further object of the invention is to provide an ear piercing earring cartridge which increases ear piercing aiming accuracy.

Yet another object of the invention is to provide an improved ear piercing earring cartridge utilizing a sliding bullet, the bullet being formed in a clam shell construction hinged at the rear of the bullet sliding direction to allow for smooth ejection of the ear piercing earring.

Still another object of the present invention is to provide an improved ear piercing instrument which reduces the amount of handling of the ear piercing earring and clutch.

Still other objects and advantages of the invention will in part be obvious and will in part be apparent from the specification.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
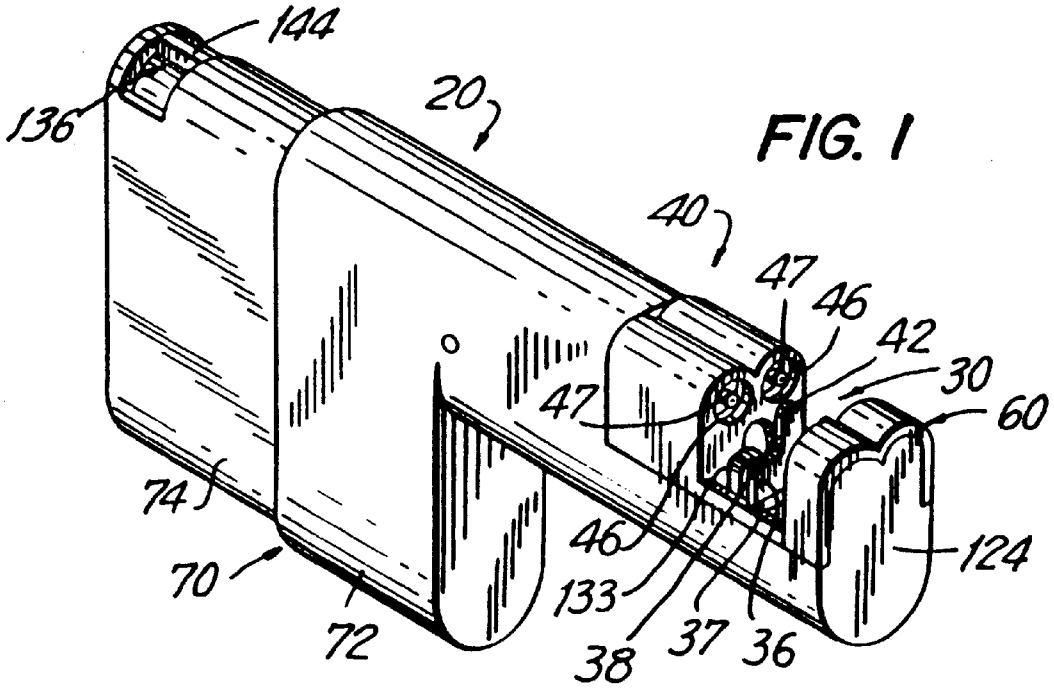
FIG. 1 is a perspective view of the ear piercing earring and clutch cartridge mounted within the ear piercing instrument constructed in accordance with the invention.

Reference is now had to FIGS. 1–6 wherein an ear piercing assembly, constructed in accordance with a preferred embodiment of the instant invention, and generally indicated as 20, is depicted. Ear piercing assembly 20 includes a unitary ear piercing earring ("earring") and clutch cartridge assembly ("cartridge assembly") 30 and an ear piercing instrument generally indicated as 70. Cartridge assembly 30 includes an ear piercing earring retaining sub-assembly 40 and a clutch retaining sub-assembly, generally indicated as 60.

Cartridge assembly 30 is formed as an integral molded piece. Earring retaining sub-assembly 40 is separated from clutch retaining sub-assembly 60 by a floor 32 forming a saddle region 34 therebetween. A pivotable clamp 36 is affixed to floor 32 within saddle region 34. A hinge 37 is formed between the clamp 36 and floor 32 allowing movement of clamp 36 towards clutch retaining sub-assembly 60. Floor 32 is formed with a slot 33 therein.

Figure 14:
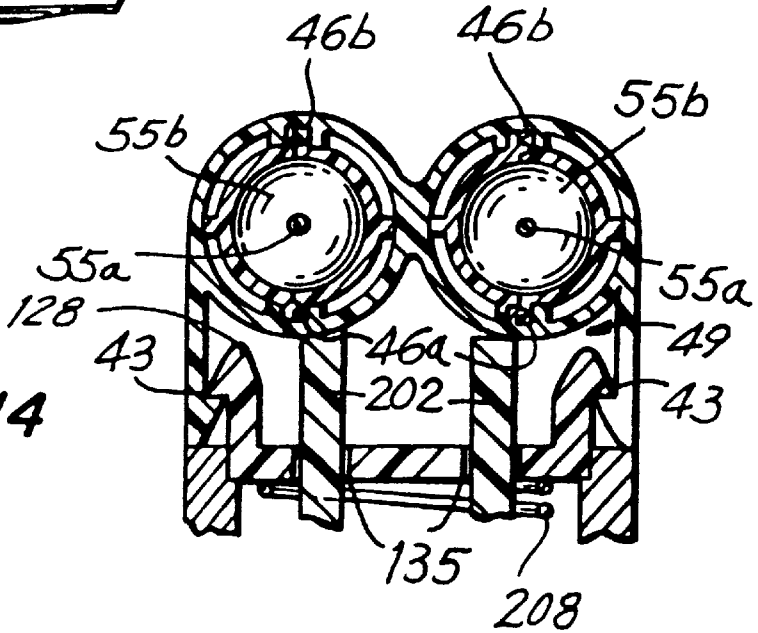
FIG. 14 is a sectional view taken along line 14—14 of FIG. 5.

Earring retaining sub-assembly 40 is integrally formed with floor 32 and includes a front support wall 42 extending therefrom and a casing 44 extending from front support wall 42. Two bores 46 axially extend for the length of casing 44 through front support wall 42 in parallel side by side relationship. Casing 44 is formed as a hollow cavity 49 below bores 46 (FIG. 14). Opposed retaining ramp surfaces 43 extend within cavity 49.

Figure 3:
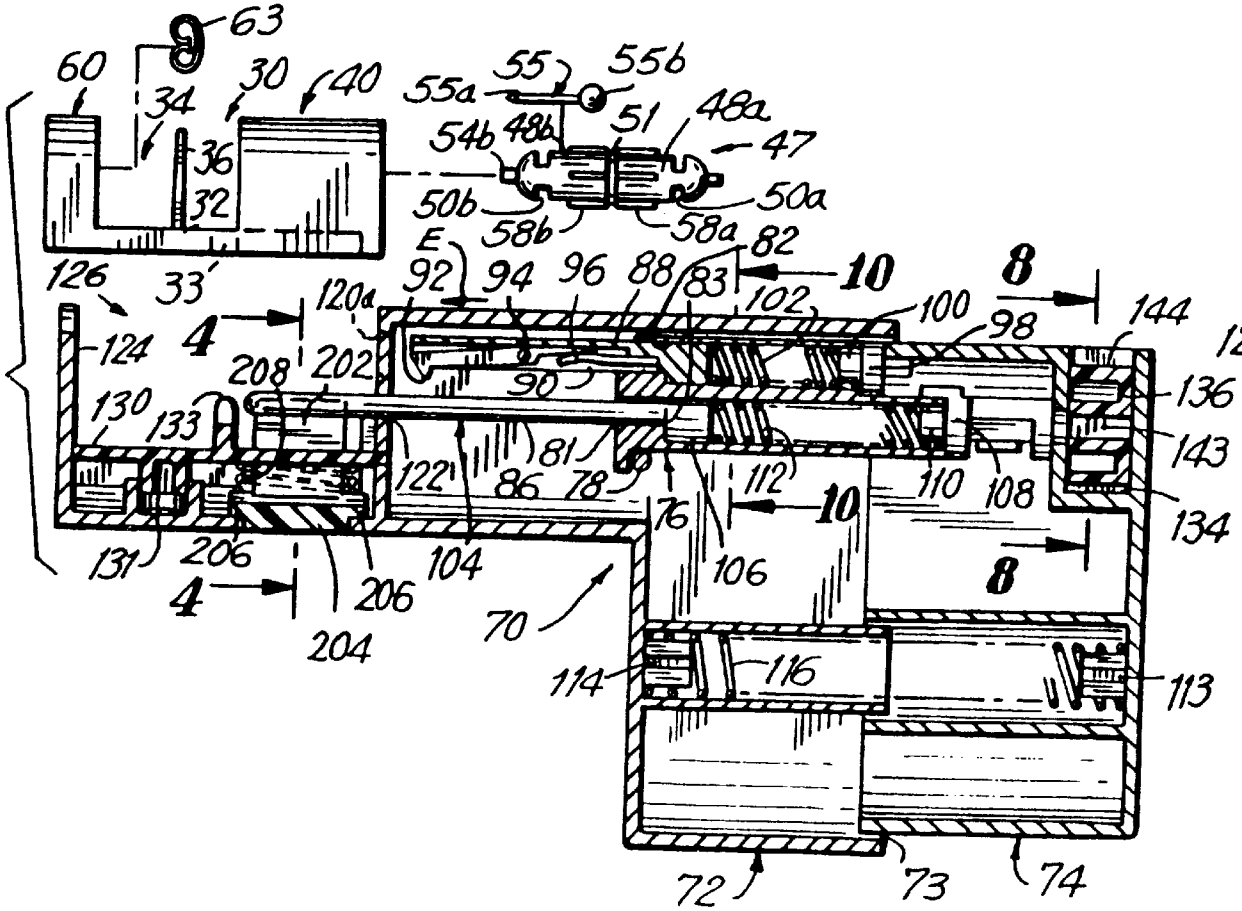
FIG. 3 is a sectional view taken along line 3—3 of FIG. 2 with the cartridge shown as exploded.
Figures 5, 6:
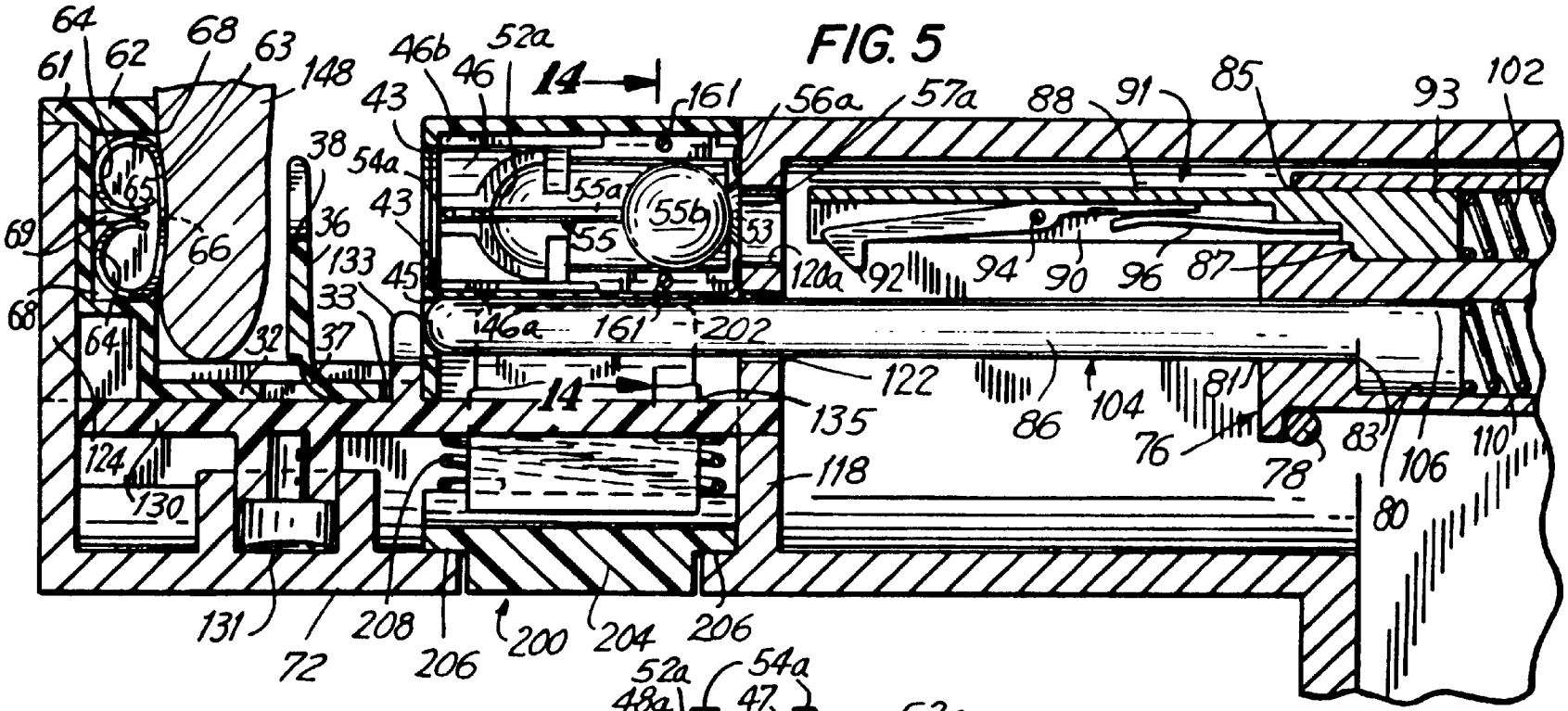
FIG. 5 is an enlarged side sectional view of the cartridge and ear piercing device constructed in accordance with the invention.
FIG. 6 is a top plan view of the earring bullet in the open position constructed in accordance with the invention.

Reference is now specifically made to FIGS. 3, 5 and 6 wherein an earring bullet cartridge 47 formed of two half walls 48a, 48b connected by a hinge 51 is depicted. In an exemplary embodiment the half walls forming bullet cartridge 47 are molded of a low friction plastic to define a low friction inner surface. Half wall 48a is symmetrical with half wall 48b and accordingly the following description with respect to half wall 48a is identical with respect to half wall 48b and each element referred to herein with the lower case letter suffix (a) has a counterpart with the same number and the suffix (b) unless otherwise specified. By way of orientation and to simplify the description of half walls 48a, the length thereof is defined herein as being along the axial direction defined by the movement of bullet cartridge 47 along bore 46.

Half wall 48a includes flexible relief slit 50a, a spherical wall 52a and an elongated channel 54a and a rear wall 56a. When half walls 48a and 48b are folded together, they, together with the rear walls 56a and 56b, , define a cavity for receiving therein an ear piercing earring 55 having a piercing pin 55a and an earring head 55b.

Rear walls 56a, 56b are secured together by hinge 51. Indentations 57a, 57b are formed in rear walls 56a, 56b respectively and define an opening 53 for receiving a push rod 88 during the ear piercing operation. Lateral projection 58a projects along half walls 48a at the rear of bullet cartridge 47. During assembly of earring retaining sub-assembly 40 and cartridge assembly 30, piercing earring 55 is positioned in one of the half walls 48a or 48b. Thereafter, half walls 48a, 48b. Thereafter, half walls 48a, 48b are folded along hinge 51 so that piercing earring 55 is disposed within bullet cartridge 47. Piercing pin 55a is positioned to define an interference fit in elongated channels 54a, 54b. Ear piercing earring head 55b rests against rear walls 56a, 56b. Half wall 48a is formed with pins 161 extending therefrom. Half wall 48b is formed with holes 163 therein dimensioned and positioned to receive pins 161 which are press fit therein. Pins 161 acting in cooperation with holes 163 maintain bullet cartridge 47 closed until the earring is ejected.

A respective bullet cartridge 47 is maintained within each bore 46. The inner diameter of bore 46 is dimensioned to provide a tension fit with lateral projections 58a, 58b of bullet cartridge 47 while allowing bullet 47 to slide through bore 46 while maintaining bullet cartridge 47 oriented within bore 46. Lateral projections 58a, 58b are slideably positioned within bore 46 by runners 46a, 46b formed within bore 46. A retaining lip 43 extends inwardly i.e., towards the axis of bore 46, at the exit end in the ejection direction of bore 46. Retaining lip 43 is dimensioned to come in contact with lateral projections 58a, 58b acting as a stop to prevent the complete ejection of bullet cartridge 47 during ear piercing.

Clutch retaining sub-assembly 60, includes a clutch casing 62 and clutches 63. Each clutch 63 is formed of a single piece of resilient metal having a C-shaped configuration forming two symmetrical loops 64, having ends 65. An opening 66 is provided in the metal for receiving piercing pin 55a of earring 55 and is coaxial with the space between ends 65.

Clutch casing 62 is a solid molded casing integrally formed with floor 32. Clutch casing 62 includes two clutch chambers 67a, 67b. The construction of clutch chamber 67a is identical to that of 67b and accordingly, for simplicity of description only clutch chamber 67a is described. Like numbers are utilized to indicate like structure.

Clutch chamber 67a is formed by a blind hole 68. A nib 69 projects from blind hole 68 and is extended to rest between the ends 65 of loops 64 of each clutch 63 to place in position and secure clutch 63 within clutch chamber 67a. When piercing pin 55a enters opening 66 and continues until it is between ends 65 of loops 64, the ends 65 are spread apart and are no longer held by nib 69. Piercing pin 55a, contacts the bottom of blind hole 68 stopping piercing pin 55a. Accordingly, each clutch chamber 67a, 67b is configured to releaseably secure clutch 63 therein until clutch 63 is secured on a piercing pin 55a of an earring after the earlobe has been pierced. Clutch case 62 is formed with a rearwardly extending clutch wall 61 tracing the outline of clutch casing 62 forming a cavity within clutch wall 61.

Reference is now made specifically to FIG. 3 in which ear piercing instrument 70 is shown as including a housing 72 having an actuator 74 slidably received therein through an opening 73 and a plunger assembly housing 76. Plunger assembly housing 76 is maintained within housing 72 by an anchor pin 78.

Housing 72 is defined by a front wall 118 having push rod openings 120a, 120b (FIG. 4) and a plunger opening 122 formed therein. An anvil 124 is formed on housing 72 and separated from front wall 118 by a cover plate 130 forming a saddle region 126 therebetween. Cover plate 130 is affixed to housing 72 by a screw 131. A keeper 133 integrally formed with cover plate 130 is positioned to extend through slot 33 of floor 32 of cartridge assembly 30. Slots 135 are formed in cover plate 130 to allow an ejector 200 to pass therethrough. A catch 128 extends from floor 130 and cooperates with retaining ramps surfaces 43 extending within cavity 45 when cartridge assembly 30 is disposed within saddle region 126 to prevent movement of cartridge 30.

When cartridge 30 is disposed within saddle region 126, cartridge floor 32 covers coverplate 130. Anvil 124 is received against clutch wall 61 to prevent sliding of cartridge 30. Keeper 133 abuts against front support wall 42 to prevent movement of earring retaining sub-assembly 40. Push rod openings 120a, 120b are coaxial with bores 46 allowing push rod 88 to extend within casing 44 to eject bullet cartridge 47. Push rod 88 is also coaxial with the hole 53 formed within bullet cartridge 47. Cutaway portions 38 are also coaxial with bores 46 allowing earring 55 to pass over clamp 36 as it is ejected. Opening 122 is coaxial with opening 45 allowing smooth passage of plunger 86 therethrough to come in contact with clamp 36. Ejector 200 is a substantially U-shaped member and includes contact arms 202 (FIG. 14) and a base 204 extending through the saddle region of housing 72. Flanges 206 extend from either side of base 204 preventing ejector 200 from passing entirely through housing 72. A spring 208 disposed between platform 130 and flanges 206 biases ejector 200 away from platform 130. Ejector arms 202 extend through slots 130, 135 of platform 130 so that when button 204 is pressed in the direction of arrow J (FIG. 7) contact arms 204 come in contact with casing 44 lifting cartridge assembly 30 from ear piercing instrument 70 by causing retaining ramps surfaces 43 to slide past catches 128.

A plunger assembly housing 76 includes plunger 86 and push rod 88, which are slidably mounted within plunger assembly housing 76. Plunger assembly housing 76 is formed with a first bore 80 having plunger 86 slidably mounted therein. A second bore 82 parallel with bore 80 is formed in plunger assembly housing 76 for slidably supporting push rod 88 therein. Bore 80 is formed with an opening 81. Opening 81 has a diameter less than bore 80 forming a shoulder 83 within bore 80. Similarly, an opening 85 of bore 82 has a diameter less than bore 82 forming a shoulder 87.

Push rod 88 is formed with a channel 90 extending substantially along the length thereof. A hook 92 is pivotably mounted within groove 90 on a pivot 94 and rotates about pivot 94. A spring 96 mounted within groove 90 biases hook 90 to extend out from groove 90. Push rod 88 is formed of a front portion 91 and a rear portion 93. Front portion 91 has a diameter substantially equal to opening 85 and is able to extend through opening 85. Rear portion 93 has a diameter substantially equal to the diameter of bore 82 and is stopped from exiting bore 82 by shoulder 87.

A plug 98 is disposed at an open end of bore 85. Plug 98 is formed with an anchor 100. Plug 98 also extends within actuator 74 so that pressure on actuator 74 pushes plunger assembly housing 76 towards opening 120. A spring 102 is between anchor 100 and rear portion 93 biasing push rod 88 through opening 85. Spring 102 acts as a push rod drive length compensator. Not all ear piercing earrings 55 are of the identical length. Accordingly, for longer earrings, push rod 88 need not extend all the way from housing 72 during the piercing operation. Once piercing pin 55a hits the rear of blind hole 68 no more driving by push rod 88 is required. Spring 102 will contact allowing push rod 88 to move rearwardly within bore 82 preventing push rod 88 from driving earring 55 too hard, in turn preventing the damaging of earring 55. Accordingly, spring 102 operating within bore 82 adapts the drive length of push rod 88 for each length earring insuring proper drive force and drive length for push rod 88.

Plunger 86 has a front portion 104 having a diameter substantially equal to opening 81 and opening 122 to pass therethrough. Plunger 86 also includes a rear portion 106 having a diameter substantially equal to the interior diameter of bore 80 so that shoulder 83 acts as a stop preventing plunger 86 from passing entirely from bore 80. A plunger plug 108 disposed within bore 80 is formed at one end with an anchor 110 extending within bore 80. A spring 112 for biasing plunger 86 towards opening 122 is anchored at one end by anchor 110 and at another by rear portion 106. In a preferred embodiment spring 112 has less of a biasing force than spring 102. Spring 112 acts in a manner similar to spring 102 and prevents plunger 86 from exerting to great a force against clamp 36. Plunger 86 contacts clamp 36 and moves it into a position where it pins an earlobe 148 against clutch retaining sub-assembly 60, the movement of clamp 36 will be stopped at a desired secure clamping pressure. As actuator 74 is continually compressed, spring 112 becomes compressed preventing an additional pressure to be applied to plunger 86 preventing plunger 86 from providing too great a clamping pressure. Spring 112 absorbs the excess drive force being applied to clamp 36 by plunger 86.

Actuator 74 is formed with an anchor 113 and housing 72 is formed with an anchor 114. A spring 116 extends from anchor 112 to anchor 114 for biasing actuator 74 away from house 72 returning actuator 74 to a non-actuating position.

Actuator 74 is formed with a recess 134 therein. A knob 136 is rotatably mounted within recess 134. Knob 136 is substantially circular in shape matching the shape of recess 134 to allow rotation therein. Recess 134 is formed with a stop member 138. Knob 136 is formed with a annular notch 140 extending along a portion of its circumference. Annular notch 140 does not extend entirely about recesses 146 so that walls 142a, 142b are formed at either end of notch 140. A finger protrusion 144 is formed on knob 136 substantially 180° opposed from the center of annular notch 140 to facilitate rotation of knob 136. Knob 136 may be rotated in either direction of a two directional arrow B. As knob 136 is rotated, a wall 142b or 142a moves closer to stop member 138 and will come in contact therewith preventing further rotation of knob 136.

Figures 9, 10:
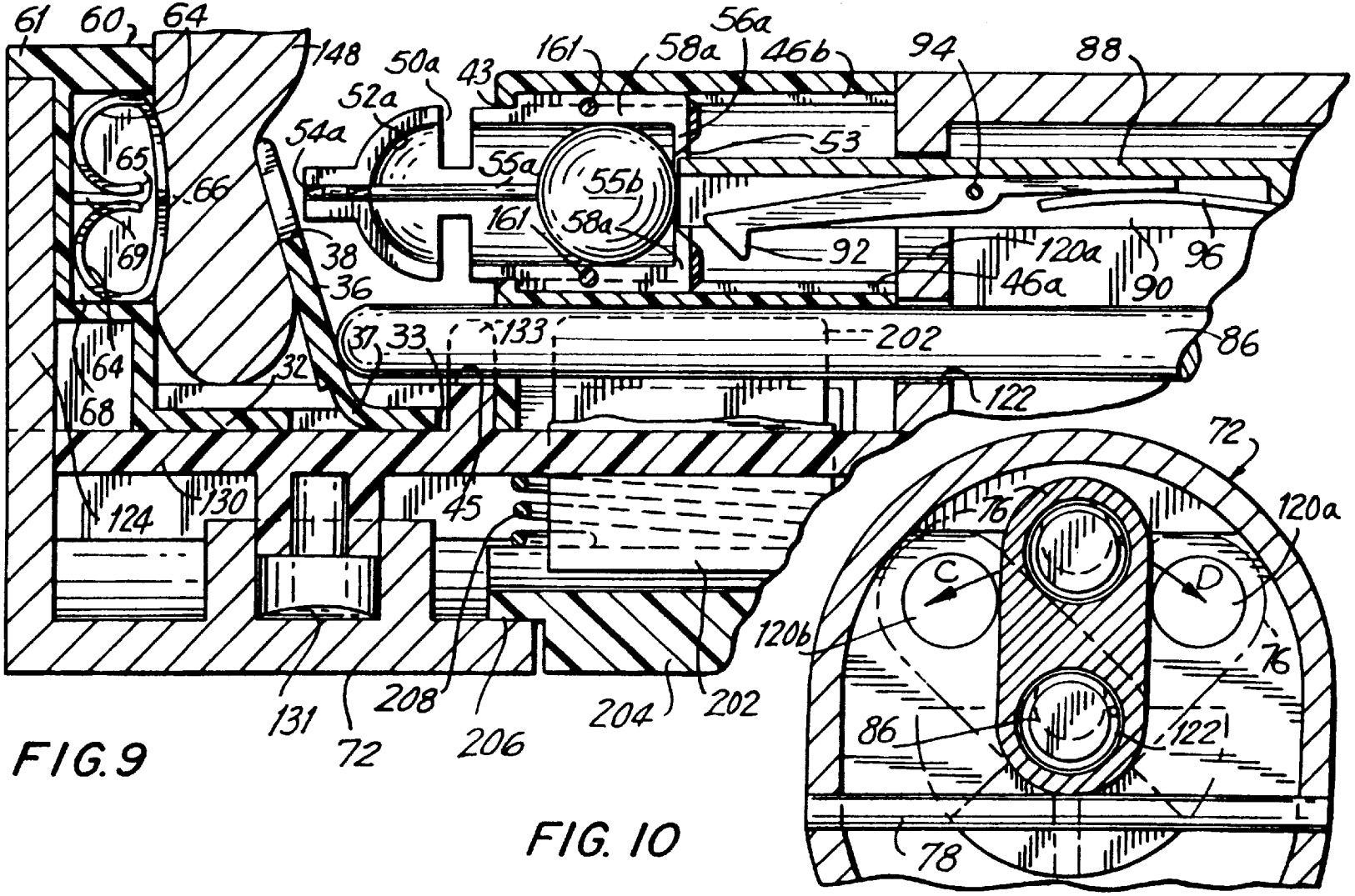
FIG. 9 is an enlarged side sectional view of the cartridge and ear piercing instrument constructed in accordance with the invention illustrating the bullet extending from the cartridge.
FIG. 10 is a sectional view taken along line 10—10 of FIG. 3.
Figure 11:
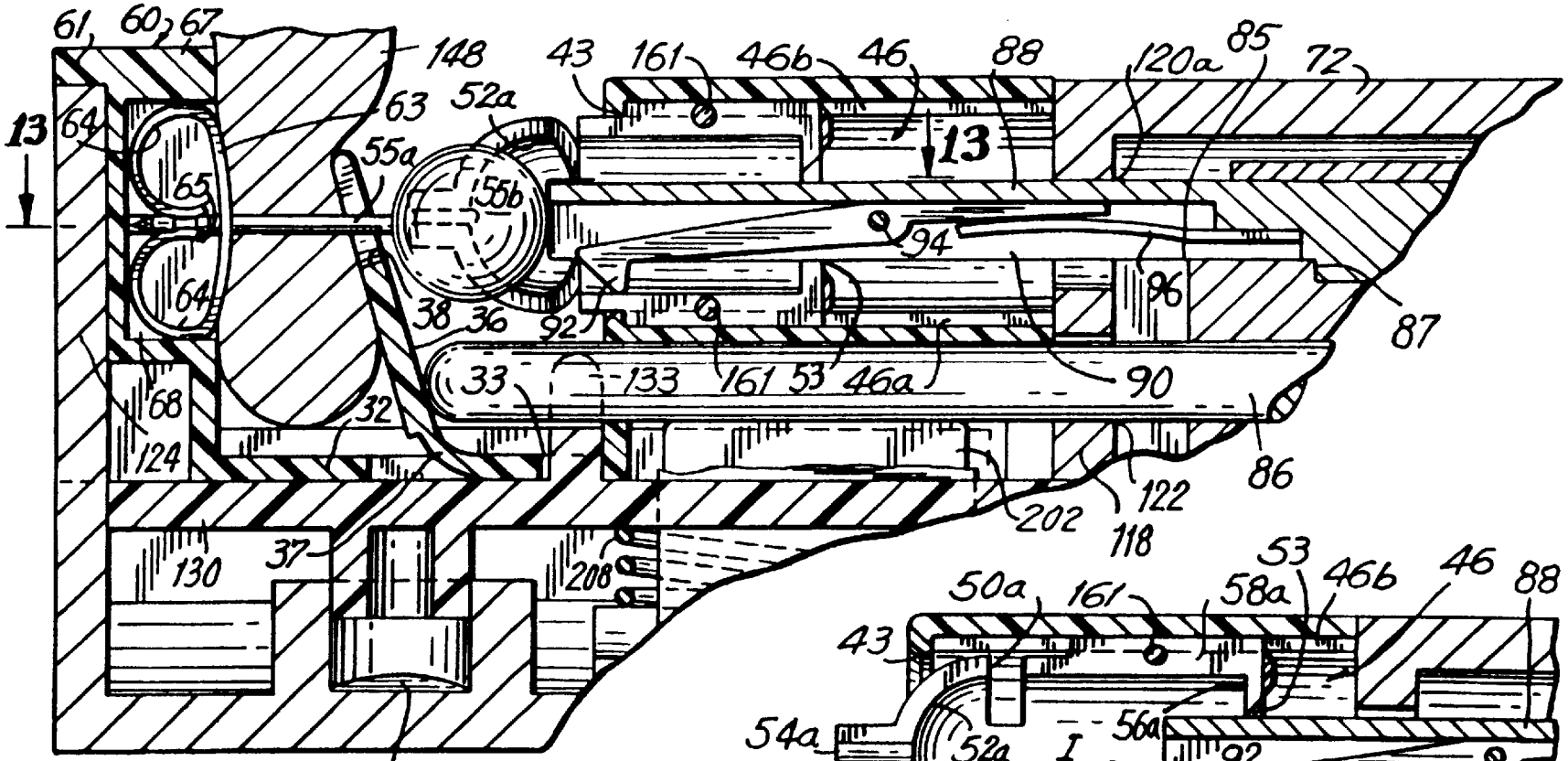
FIG. 11 is an enlarged side sectional view of the cartridge and ear piercing instrument constructed in accordance with the invention showing the ejection of the ear piercing earring.

Knob 136 is formed with a square recess 146. A peg 143 extends from plunger plug 108 into recess 146. The outline of peg 143 is also square so that rotation of knob 136 rotates plunger plug 108 and in effect rotates plunger assembly housing 76 (FIG. 10) about plunger 86. Plunger 86 forms the center of the axis of rotation for plunger assembly housing 76. Plunger assembly housing 76 rotates in the direction of either arrow C or arrow D (FIG. 10) bringing push rod 88 in axial alignment with either one of opening 120a or 120b, respectively when a respective wall 142a, 142b contacts stop member 138.

Reference is now made to FIGS. 3, 5, 7 and 9 in explaining operation of ear piercing instrument 20. Prior to operation, air piercing earring 55 is placed within half wall 48b of bullet cartridge 47. Half wall 48a is then rotated about hinge 51. Bullet cartridge 47 is then placed within earring retaining sub-assembly 40. A clutch is placed within clutch retaining sub-assembly 60. The entire cartridge is sterilized and shipped.

At the site of application, cartridge 30 is placed within saddle region 126 and ramp surfaces 43 are secured by catch 128, clutch wall 61 of clutch retaining sub-assembly 60 contacts anvil 124 securing cartridge 30 in place within saddle region 126 of ear piercing instrument 70.

Figures 7, 8:
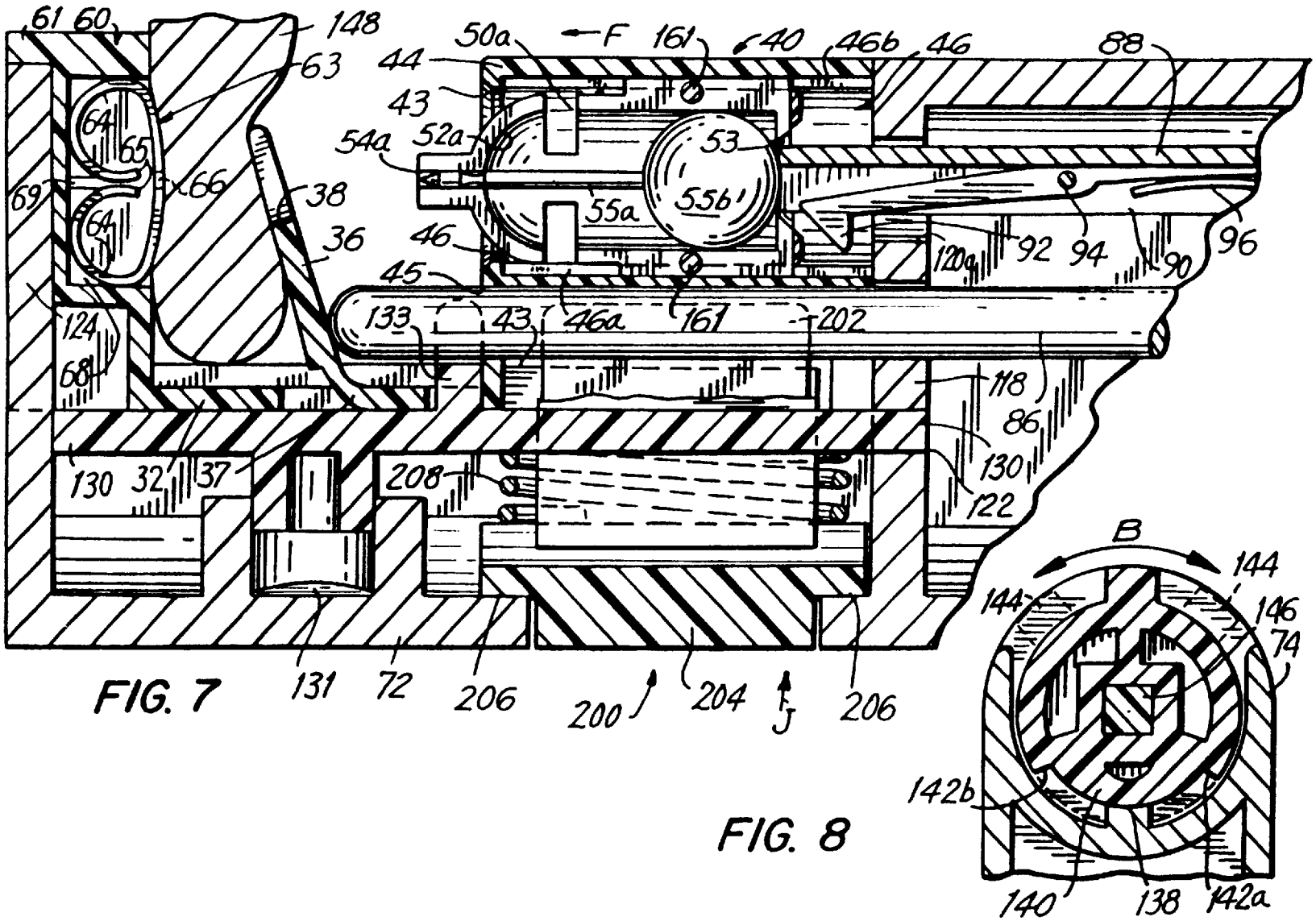
FIG. 7 is an enlarged side sectional view of the instrument and cartridge showing the earlobe in a clamped position.
FIG. 8 is a sectional view taken along line 8—8 of FIG. 3.

By way of example, to begin piercing, knob 136 is in the left position of arrow B as viewed in FIG. 8 so that push rod 88 is adjacent and coaxial with opening 120a (FIG. 5). At the same time plunger 86 is adjacent and coaxial with opening 45 within cartridge 30.

Plunger 86 extends farther than push rod 88 and leads push rod 88 as actuator 74 is actuated. A squeezing pressure is applied on actuator 74 moving actuator 74 through opening 73 into housing 72. As actuator 74 moves into housing 72, a force is provided in the direction of arrow E causing plunger 86 and push rod 88 to move in the direction of arrow E. Plunger 86 contacts clamp 36 moving clamp 36 from a first rest position towards anvil 124 into a second position clamping an earlobe 148 between clamp 36 and clutch cartridge retaining means 60. Simultaneously, push rod 88 passes through opening 120a and contacts bullet cartridge 47 pushing bullet cartridge 47 in the direction of arrow F (FIG. 7). As a bullet cartridge 47 slides within bore 46, bullet cartridge 47 extends from bore 46 towards earlobe 148. Elongated channel 54 formed at the front traveling end of bullet cartridge 47 aids in aiming bullet cartridge 47 towards earlobe 148.

As actuator 74 is continually squeezed, push rod 88 continues to slide bullet cartridge 47 through bore 46 until lateral projections 58a, 58b contact retaining lip 43 stopping further sliding of bullet cartridge 47. Simultaneously, plunger 86 continues to apply pressure against clamp 36 maintaining the ear in place. However, the pressure on earlobe 148 does not substantially increase because weaker spring 112 absorbs the force as actuator 74 is compressed into housing 72 so that clamp 36 acts as a stop for plunger 86 in cooperation with spring 112 so that an excessive pressure is not applied against earlobe 148.

As actuator 74 is continuously moved within housing 72, the force on push rod 88 causes push rod 88 to move through opening 53 formed by indentations 57a, 57b. Hook 92 having an angled forward surface slides up and over rear wall 56b of bullet cartridge 47 entering opening 53 and is then returned to its extended position by the bias force applied by spring 96.

Figure 13:
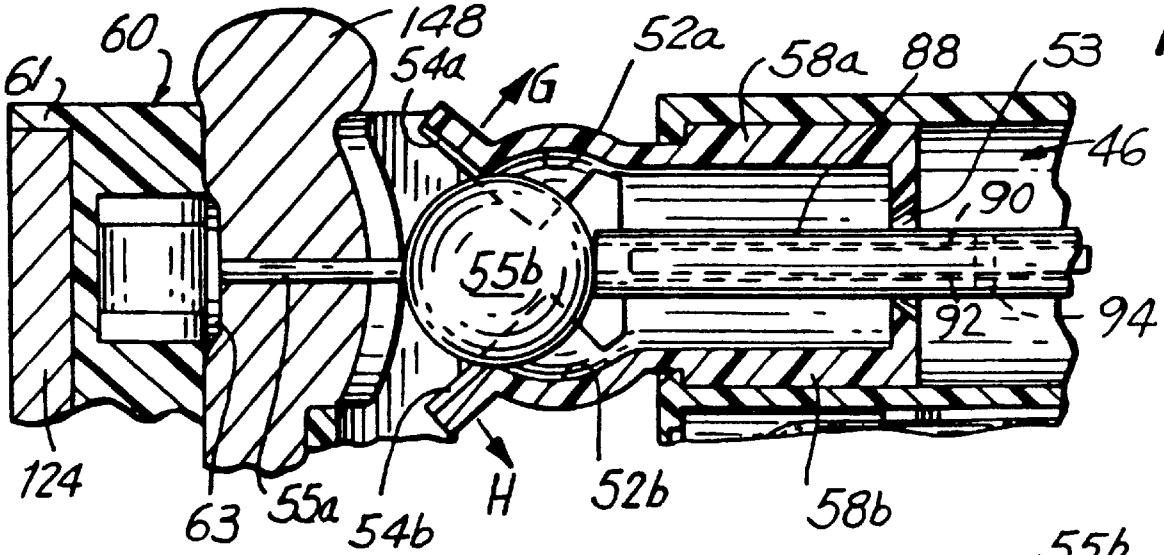
FIG. 13 is a sectional view taken along line 13—13 of FIG. 11.

Push rod 88 comes in contact with ear piercing earring head 55b pushing ear piercing earring head 55b through bullet cartridge 47 causing the tapering walls 52a, 52b to separate in the directions of arrows G, H (FIG. 13). Flexible relief slits 50a, 50b are closed as tapered walls 52a, 52b are opened by the earring 55b, thereby providing clearance to allow separation of tapering walls 52a, 52b. Piercing pin 55a extends past cutaway portion 38 of clamp 36, pierces earlobe 148 and is secured by ends 65 of clutch 63 and contacts the rear of blind hole 68. Blind hole 68 acts as a stop to piercing pin 55a, preventing further driving by push rod 88. Spring 102 absorbs any continued driving force adjusting the drive length and drive force to prevent overdriving. By separating ends 65 of clutch 63, the tension between ends 65 and nib 69 is relieved allowing free removal of clutch 63 from clutch chamber 67a.

Actuator 74 is then released. Spring 116 provides a biasing force pushing actuator 74 out from housing 72. Plunger 72 is coupled to actuator 74 by way of plunger plug 108 and push rod 88 is affixed to actuator 72 by way of plug 98 so that as actuator 74 moves in a direction opposite to that of arrow E, plunger 86 and push rod 88 are withdrawn into housing 72.

Figure 12:
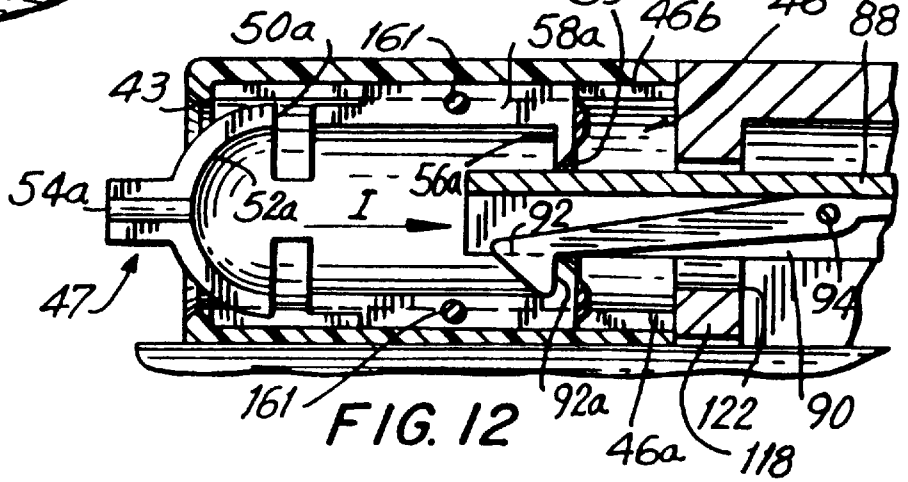
FIG. 12 is a side sectional view of the ear piercing cartridge and ear piercing instrument constructed in accordance with the invention illustrating the return of the bullet within the cartridge.

As push rod 88 is withdrawn, hook 92 engages rear wall 56b of bullet cartridge 47 sliding bullet cartridge 47 in the direction of arrow I (FIG. 12), within bore 46. Bullet 47 is closed as it retracts within bore 46. Once rear wall 56a, 56b contacts front wall 118 bullet cartridge 47 is prevented from moving any further in the direction of arrow I. The rear surface 92a of hook 92 is provided with a slight angle of about 6° allowing it to slide over rear wall 56b within groove 90 to slide through opening 53 formed by indentations 57a, 57b. Push rod 88 returns to the position shown in FIG. 5.

To form a second hole within an earlobe utilizing the second ear piercing earring contained within cartridge 30, knob 136 is rotated in the opposite direction of arrow B, rotating plunger assembly housing 76 until stop member 138 comes in contact with wall 142a so that push rod 88 is now coaxial with opening 120b. The process described above is now repeated to eject the second ear piercing earring 55 contained within cartridge assembly 30.

When both piercing earrings 55 have been ejected, the spent cartridge is ejected from housing 72 by pressing on ejector 200. This causes assembly 30 to become dislodged from housing 72 so that if the operator is performing ear piercing near a disposal site, such as a trash can, the operator merely activates the ejector 200 by pressing button 204 to drop the cartridge into the trash can without touching the used cartridge further preventing cross contamination to the ear piercing operator. Spring 208 returns ejector 200 to a non-ejecting position.

Figure 2:
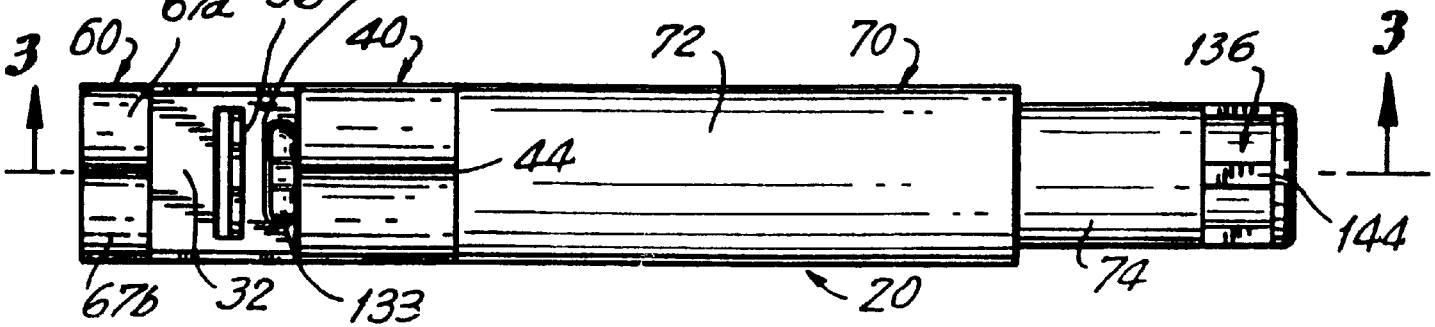
FIG. 2 is a top plan view of the cartridge and ear piercing instrument constructed in accordance with the invention.
Figure 4:
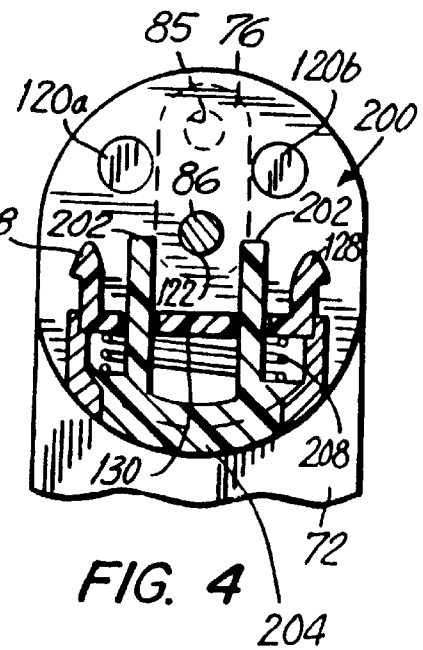
FIG. 4 is a sectional view taken along line 4—4 of FIG. 3.

It should also be noted as seen from FIGS. 2 and 3, cartridge 30 surrounds and extends beyond saddle region 126 of ear piercing instrument 70. Accordingly, by being dimensioned to be at least coextensive with platform 130, anvil 124 and front wall 118, cartridge 30 act as a splash shield substantially removing any chance of blood or body fluid splattering against ear piercing instrument 70 to be transmitted to the next user of the ear piercing instrument 70.

By constructing an ear piercing instrument having a push rod that is pivotable about a plunger, so that the push rod is displaceable from a first position behind a first earring coaxial with an earring retaining sub-assembly bore to a second position behind a second earring coaxial with a second retaining sub-assembly bore without touching the earring retaining sub-assembly, an ear piercing assembly which effectively eliminates handling of the cartridge assembly after sterilization is provided. By providing a clamp, which is activated before ear piercing, misfiring and misaiming is reduced because the earlobe is now locked in place during piercing. Additionally, by utilizing a bullet cartridge in which the hinge is formed at the rear of the bullet cartridge rather than the front of the bullet cartridge, it is no longer necessary to break the hinge as piercing occurs allowing for a smooth, continuous piercing motion, further preventing misfiring or operator difficulty.

It will thus be seen that the objects set forth above, among those made apparent from the previous description, are efficiently obtained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims cover all the generic and specific features of the invention herein described and all statements of the scope of the invention which, as a matter of language might be said to fall therebetween.

What is claimed is:

1. An ear piercing cartridge assembly comprising a cartridge assembly, said cartridge assembly comprising a first and second ear piercing earring; ear piercing earring retaining sub-assembly means for releasably supporting both said ear piercing earrings, said ear piercing earring retaining sub-assembly means including a casing having a bore therethrough; a bullet cartridge means for maintaining an ear piercing earring therein, said bullet cartridge means being slidably disposed within said bore to allow movement between a first position and a second position within said bore; a first and second clutch; clutch retaining sub-assembly means integrally formed with said ear piercing earring retaining sub-assembly means for releaseably supporting both of said clutches, a floor disposed between said ear piercing earring retaining sub-assembly forming a protective shield and said clutch retaining sub-assembly forming a saddle region therein; clamp means disposed on said floor for being moved between a first position and a second position, the clamp means clamping an earlobe disposed within said saddle region against said clutch retaining sub-assembly means at said second position; ear piercing instrument means for supporting said cartridge assembly thereon, said ear piercing instrument means including a plunger assembly means supporting said cartridge assembly for ejecting an ear piercing [sub-assembly means] *earring* from said ear piercing earring retaining sub-assembly means; displacement means for selectively moving said plunger assembly means between a first position for ejecting said first ear piercing earring from said ear piercing earring retaining means and a second position for ejecting said second ear piercing earring from said ear piercing earring retaining means; said plunger assembly means including a plunger assembly housing, a push rod disposed within said plunger assembly housing for ejecting said ear piercing earring, displacement of said push rod ejecting said ear piercing earring; said plunger assembly housing rotating about said plunger to selectively move said push rod between said first position for ejecting said first ear piercing earring and said second position for ejecting said second ear piercing earring; clamp activation means for moving said clamp means from said first position; said clamp activation means including said plunger, said plunger causing said clamp to provide a pressure against an earlobe; pressure compensation means for compensating the amount of pressure to be applied by said plunger; said plunger assembly means further comprising retraction means for returning said bullet cartridge means from said second position to said first position; and earring length compensation means for controlling the amount of displacement of said push rod in response to the length of the ear piercing earring being ejected by said push rod.

2. The ear piercing assembly of claim 1, wherein said clamp activation means moves the clamp means to said second position prior to said plunger assembly means ejecting an ear piercing earring from said ear piercing earring retaining means.

3. The ear piercing assembly of claim 2, wherein said bullet cartridge means includes a first half wall and a second half wall joined to said first half wall by a hinge formed at a rear portion thereof; an opening being formed in a rear surface of said bullet cartridge means and said retraction activation means including said push rod, said push rod being formed with a groove therein and a hook being rotatably supported within said groove for engaging a rear wall of said bullet cartridge means.

4. An ear piercing cartridge assembly comprising: a first and second ear piercing earring; ear piercing earring retaining sub-assembly means for releasably supporting both said ear piercing earrings; a first and second clutch; clutch retaining sub-assembly means integrally formed with said ear piercing earring retaining sub-assembly means for releaseably supporting both of said clutches.

5. The ear piercing cartridge assembly of claim 4, wherein said ear piercing earring retaining sub-assembly means includes a bore extending therethrough; bullet cartridge means slidably disposed within said bore, an ear piercing earring being disposed within said bullet cartridge means, said bullet cartridge means being formed of a first half wall and a second half wall, said ear piercing earring being ejected from said bullet cartridge means during ear piercing, said first half wall being affixed to said second half wall at the rear portion of said bullet cartridge means in the ejection direction.

6. The ear piercing cartridge assembly of claim 5, wherein a hinge is formed between said first half wall and said second half wall at the rear portion of said bullet cartridge means, each half wall having a radial configuration progressing towards the forward portion of said bullet cartridge means in the ejection direction forming a ramp at the front portion of said bullet cartridge means, said ear piercing earring contacting said ramp causing said half walls to separate releasing said ear piercing earring during ejection.

7. The ear piercing cartridge assembly of claim 4, further comprising a floor, said floor being disposed between said ear piercing earring retaining sub-assembly means and said clutch retaining sub-assembly means forming a saddle region in said cartridge assembly; and clamp means integrally formed with said floor, said clamp means being movable between a first position and a second position, said clamp means clamping an earlobe disposed within said saddle region against said clutch retaining sub-assembly means when said clamp means is in said second position.

8. An ear piercing earring cartridge assembly comprising [a first and second] *an* ear piercing earring; ear piercing earring retaining sub-assembly [means] for releaseably supporting [both] said ear piercing [earrings] *earring*; a [first and second] clutch; *a* clutch retaining sub-assembly [means] for releaseably supporting [both] said [clutches] *clutch*; a floor disposed between said ear piercing earring sub-assembly [means] and said clutch sub-assembly [means] forming a saddle region therein; and *a* clamp [means] movable from a first position to a second position for clamping an earlobe disposed within said saddle region[,] against said clutch retaining sub-assembly [means] when said [clamping means] *clamp* is in said second position.

9. The ear piercing earring cartridge assembly of claim 8, wherein said clamp [means] includes a pivotable clamp and a hinge disposed between said floor and said *pivotable* clamp, said *pivotable* clamp moving about said hinge between said first position and said second position.

10. An ear piercing cartridge assembly comprising a first and second ear piercing earring; ear piercing earring retaining sub-assembly means for releasably supporting both said ear piercing earrings; a first and second clutch; clutch retaining sub-assembly means integrally formed with said ear piercing earring retaining sub-assembly means for releaseably supporting both of said clutches; a floor, said floor being disposed between said ear piercing earring retaining sub-assembly means and said clutch retaining sub-assembly means forming a saddle region therebetween; clamp means integrally formed with said floor, said clamp means being movable between a first position and a second position, said clamp means clamping an earlobe disposed within said saddle region against said clutch retaining sub-assembly means when said clamp means is in said second position.

11. The ear piercing cartridge assembly of claim 10, wherein said ear piercing earring retaining sub-assembly means includes a bore extending therethrough; bullet cartridge means slidably disposed within said bore, an ear piercing earring being disposed within said bullet cartridge means, said bullet cartridge means being formed of a first half wall and a second half wall, said ear piercing earring being ejected from said bullet cartridge means during ear piercing, said first half wall being affixed to said second half wall at the rear of said bullet cartridge means in the ejection direction.

12. An ear piercing assembly comprising a cartridge assembly, said cartridge assembly including a first and second ear piercing earring; ear piercing earring retaining sub-assembly means for releasably supporting both said ear piercing earrings; a first and second clutch; clutch retaining sub-assembly means integrally formed with said ear piercing earring retaining sub-assembly means for releaseably supporting both of said clutches; and ear piercing instrument means for supporting said cartridge assembly thereon, said ear piercing instrument means including a plunger assembly means supported within said ear piercing instrument means for ejecting an ear piercing earring from said ear piercing earring retaining sub-assembly means; and displacement means for selectively moving said plunger assembly means between a first position for ejecting said first ear piercing earring from said ear piercing earring retaining means and a second position for ejecting said second ear piercing earring from said ear piercing earring retaining sub-assembly means.

13. The ear piercing assembly of claim 12, wherein said plunger assembly means includes a plunger assembly housing, a push rod disposed within said plunger assembly housing for ejecting said ear piercing earring.

14. The ear piercing assembly of claim 13, wherein said plunger assembly means further comprises a plunger disposed within said plunger assembly housing, said plunger assembly housing rotating about said plunger to selectively move said push rod between said first position for ejecting said first ear piercing earring and said second position for ejecting said second ear piercing earring.

15. The ear piercing assembly of claim 14, wherein said cartridge assembly includes a floor disposed between said ear piercing earring retaining sub-assembly and said clutch retaining sub-assembly forming a saddle region therein; clamp means disposed on said floor for being moved between a first position and a second position, the clamp means clamping an earlobe disposed within said saddle region against said clutch retaining sub-assembly means at said second position; and said plunger assembly means including clamp activation means for moving said clamp means from said first position.

16. The ear piercing assembly of claim 15, wherein said clamp means includes a clamp and a flexible hinge, said flexible hinge being disposed between said floor and said clamp and said clamp activation means includes said plunger.

17. The ear piercing assembly of claim 16, wherein said plunger causes said clamp to provide a pressure against an earlobe and further comprising pressure compensation means for compensating the amount of pressure to be applied by said clamp.

18. The ear piercing assembly of claim 17, wherein said pressure compensation means includes a spring coupled to said plunger.

19. The ear piercing assembly of claim 12, wherein said ear piercing instrument means is formed with a front wall, an anvil and a floor disposed therebetween forming a saddle region therebetween, said cartridge assembly being disposed within said saddle region, and further comprising a catch formed in said saddle region and ramped surfaces formed on said ear piercing earring retaining sub-assembly means cooperating with said catch for releasably maintaining said cartridge assembly within said saddle region.

20. [The] *An* ear piercing *cartridge* assembly [of claim 19, further] comprising [ejecting means] *a cartridge assembly, said cartridge assembly comprising an ear piercing earring; an ear piercing earring retaining subassembly for releasably supporting said ear piercing earring; a clutch; a clutch retaining subassembly integrally formed with said ear piercing earring retaining subassembly for releasably supporting said clutch; a floor disposed between said ear piercing earring retaining subassembly and said clutch retaining subassembly forming a first saddle region therein; an ear piercing instrument for supporting said cartridge assembly thereon, said ear piercing instrument including a plunger assembly supporting said cartridge assembly for ejecting said ear piercing earring from said ear piercing earring retaining subassembly; and a cartridge assembly ejector* for ejecting said cartridge assembly from said ear piercing instrument [means].

21. The ear piercing [instrument] *cartridge assembly* of claim 20, wherein said [ejection means] *cartridge assembly ejector* includes a substantially U-shaped member slidably disposed within said ear piercing instrument having a first contact arm and a second contact arm for contacting said cartridge assembly, a button, each of said contact arms being integrally formed with said button and *a* biasing [means] *member* for biasing said contact arms away from said cartridge assembly, said contact arms causing said catch to release said ramp surfaces.

22. The ear piercing assembly of claim 12, wherein said cartridge assembly includes a floor disposed between said ear piercing earring retaining sub-assembly and said clutch retaining sub-assembly forming a saddle region therein; clamp means disposed on said floor for being moved between a first position and a second position, the clamp means clamping an earlobe disposed within said saddle region against said clutch retaining sub-assembly means at said second position; and said plunger assembly means including clamp activation means for moving said clamp means from said first position to said second position.

23. The ear piercing assembly of claim 22, wherein said clamp activation means moves the clamp means to said second position prior to said plunger assembly means ejecting an ear piercing earring from said ear piercing earring retaining sub-assembly means.

24. The ear piercing assembly of claim 12, further comprising cartridge assembly ejecting means for ejecting said cartridge assembly from said ear piercing instrument means.

25. The ear piercing instrument of claim 24, wherein said ejection means includes a substantially U-shaped member slidably disposed within said ear piercing instrument having a first contact arm and a second contact arm for contacting said cartridge assembly, a button, each of said contact arms being integrally formed with said button and biasing means for biasing said contact arms away from said cartridge assembly.

26. [The] *An* ear piercing assembly [of claim 12, wherein] *comprising a cartridge assembly, said cartridge assembly including a piercing earring; an ear piercing earring retaining sub-assembly for releasably supporting said ear piercing earring; an ear piercing instrument for supporting said cartridge assembly thereon, said ear piercing instrument including a plunger assembly supported within a housing for ejecting said ear piercing earring from said ear piercing earring retaining subassembly, said ear piercing retaining assembly* [means includes] including a casing having a bore therethrough; *a* bullet cartridge [means] for maintaining [an] *said* ear piercing earring therein, said bullet cartridge [means] being slidably disposed within said bore to allow movement between a first position and a second position within said bore, said plunger assembly [means] further comprising *a* retraction [means] *assembly* for returning said bullet cartridge [means] from said second position to said first position.

27. The ear piercing assembly of claim 12, wherein said ear piercing instrument includes a front wall, an anvil and a floor disposed therebetween forming a saddle region within said ear piercing instrument, said cartridge assembly including a floor disposed between said clutch cartridge retaining sub-assembly means and said ear piercing earring retaining sub-assembly means forming a saddle region therebetween, the saddle region of said cartridge assembly being dimensioned to be coextensive with the saddle region of said ear piercing instrument, shielding said ear piercing instrument from contamination during ear piercing.

28. The ear piercing assembly of claim 14, wherein said ear piercing earring retaining sub-assembly means includes a casing having a bore therethrough; bullet cartridge means for maintaining an ear piercing earring therein, said bullet cartridge means being slidably disposed within said bore to allow movement between a first position and a second position within said bore, said plunger assembly means further comprising retraction means for returning said bullet cartridge means from said second position to said first position.

29. The ear piercing assembly of claim 28, wherein said bullet cartridge means includes a first half wall and a second half wall, a hinge joining said first half wall to said second half wall at a rear portion thereof; an opening formed in a rear surface of said bullet cartridge means and said retraction activation means including said push rod, said push rod being formed with a groove therein and a hook being rotatably supported within said groove for engaging a rear wall of said bullet cartridge means at said opening.

30. The ear piercing assembly of claim 29, further comprising biasing means for biasing said hook to extend out from said groove.

31. The ear piercing assembly of claim 14, wherein said displacement means includes a plunger plug having a first end coupled with said plunger assembly housing, a rotatable knob disposed within said ear piercing instrument, a second end of said plunger plug being operatively coupled to said knob.

32. The ear piercing assembly of claim 13, wherein displacement of said push rod ejects said ear piercing earrings from said cartridge assembly and further comprising earring length compensation means for controlling the amount of displacement of said push rod in response to the length of the ear piercing earring being ejected by said push rod.

33. The ear piercing assembly of claim 32, wherein said earring length compensation means includes a spring coupled to said push rod.

34. The ear piercing instrument of claim 19, wherein said earring length compensation means includes a spring coupled to said push rod.

35. The ear piercing assembly of claim 29, wherein said ear piercing instrument means includes a platform extending within said saddle region, a keeper integrally formed with said platform said keeper extending through said floor in preventing movement of said cartridge assembly during piercing.

36. An ear piercing instrument for ejecting an ear piercing earring from a cartridge assembly comprising a housing adapted to receive said cartridge assembly; plunger assembly means supported within said housing for ejecting an ear piercing earring from said cartridge assembly, said plunger assembly means including a push rod displaceable for ejecting an earring from said cartridge, and earring length compensation means for controlling the displacement distance of said push rod in response to the length of the ear piercing earring being ejected by said push rod.

*37. An ear piercing cartridge assembly comprising a cartridge assembly, said cartridge assembly comprising an ear piercing earring; an ear piercing earring retaining subassembly for releasably supporting said ear piercing earring; a clutch; a clutch retaining subassembly for releasably supporting said clutch, an ear piercing instrument including a push rod for ejecting said ear piercing earring from said ear piercing earring retaining subassembly; said ear piercing earring retaining subassembly and clutch retaining subassembly being mounted on said ear piercing instrument and a pressure compensator for compensating the amount of pressure to be applied by said push rod in response to the length of the ear piercing earring being ejected by said push rod.*

*38. An ear piercing assembly comprising a cartridge assembly, said cartridge assembly comprising an ear piercing earring; an ear piercing earring retainer subassembly for releasably supporting said ear piercing earring; a clutch; a clutch retainer subassembly integrally formed with said ear piercing earring retaining subassembly for releasably supporting said clutch, a floor disposed between said ear piercing earring subassembly and said clutch retaining subassembly for forming a saddle region therein; a clamp disposed on said floor movable between a first position and a second position, the clamp clamping an ear lobe disposed within said saddle region against said clutch retaining subassembly at said second position; an ear piercing instrument for supporting said cartridge assembly thereon, said ear piercing instrument including a plunger assembly supporting said cartridge assembly for ejecting said ear piercing earring from said ear piercing earring retaining subassembly; a clamp activator for moving said clamp from said first position; said clamp activator including a plunger, said plunger causing said clamp to provide a pressure against an ear lobe; and a pressure compensator for compensating the amount of pressure to be applied by said plunger in response to the length of the ear piercing earring being ejected by said plunger assembly.*

*39. An ear piercing assembly comprising a cartridge assembly, said cartridge assembly including an ear piercing earring; an ear piercing earring retaining sub-assembly for releasably supporting said ear piercing earring; a clutch; a clutch retaining sub-assembly integrally formed with said ear piercing earring retaining sub-assembly for releasably supporting said clutch; said ear piercing earring retaining sub-assembly including a casing having a bore therethrough; a bullet cartridge for maintaining said ear piercing earring therein, said bullet cartridge being slidably disposed within said bore to allow movement between a first position and a second position within said bore; an ear piercing instrument for supporting said cartridge assembly thereon, said ear piercing instrument including a plunger assembly supported within said ear piercing instrument for ejecting said ear piercing earring from said ear piercing earring retaining sub-assembly; said plunger assembly including a plunger assembly housing, a push rod disposed within said plunger assembly housing for ejecting said ear piercing earring; said plunger assembly further comprising a retractor for returning said bullet cartridge from said second position to said first position.*

*40. The ear piercing assembly of claim 39, wherein said bullet cartridge includes a first half wall and a second half wall, a hinge joining said first half wall to said second half wall at a rear portion thereof; an opening formed in a rear surface of said bullet cartridge and said retractor including said push rod, said push rod being formed with a groove therein and a hook being rotatably supported within said groove for engaging a rear wall of said bullet cartridge at said opening.*

*41. The ear piercing cartridge assembly of claim 20, wherein said ear piercing instrument includes a second saddle region, said cartridge assembly being disposed within said second saddle region, and further comprising a catch formed in said second saddle region and ramped surfaces formed on said ear piercing earring retaining subassembly cooperating with said catch for releasably maintaining said cartridge assembly within said second saddle region.*

* * * * *